Oct. 4, 1966  H. L. HUMES, JR  3,276,797
SPLINE FASTENING DEVICE
Filed April 27, 1962  2 Sheets-Sheet 1
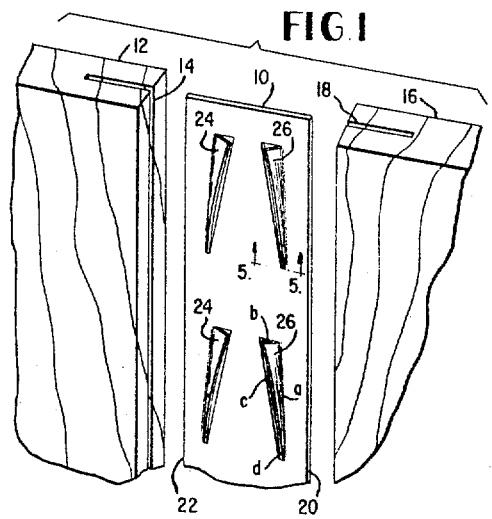
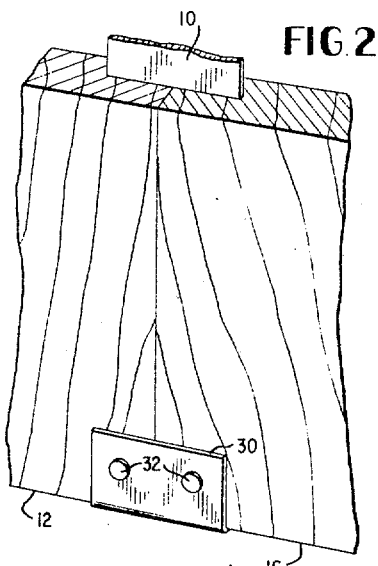
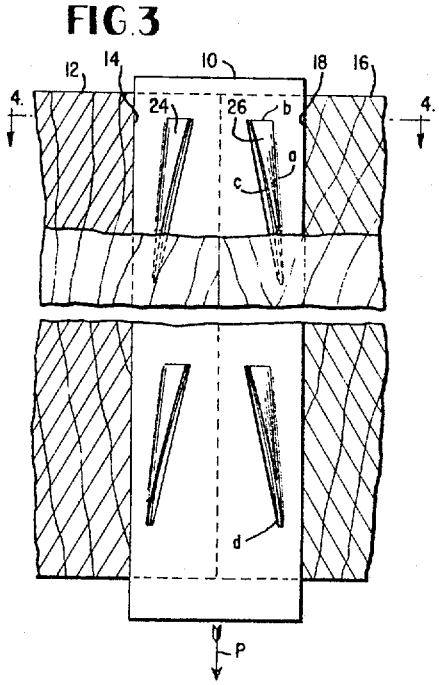
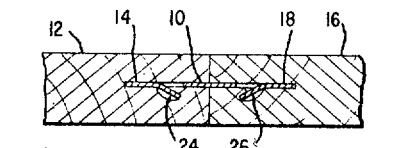
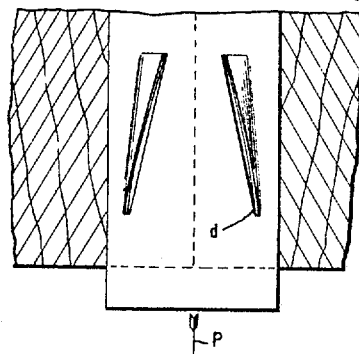
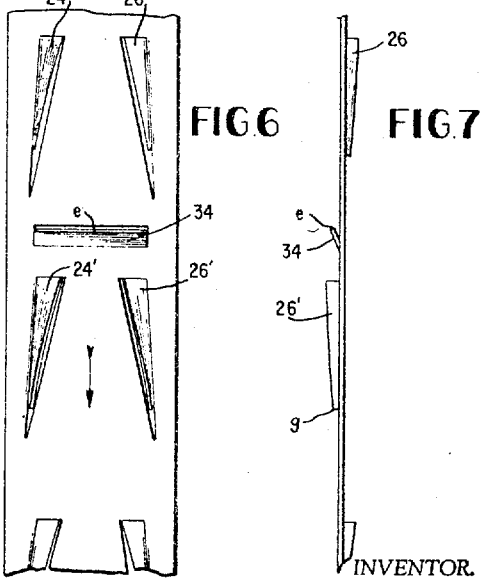
INVENTOR.
HAROLD L. HUMES, JR.
BY
Sughrue, Rothwell, Mion & Zinn
ATTORNEYS Oct. 4, 1966   H. L. HUMES, JR   3,276,797
SPLINE FASTENING DEVICE Filed April 27, 1962   2 Sheets-Sheet 2

INVENTOR.
HAROLD L. HUMES, JR.
BY
*Sughrue, Rothwell, Mion & Zinn*
ATTORNEYS

United States Patent Office 3,276,797
Patented Oct. 4, 1966

3,276,797
SPLINE FASTENING DEVICE
Harold L. Humes, Jr., New York, N.Y., assignor to
Parametrics Research and Development Company, Inc.
Filed Apr. 27, 1962, Ser. No. 190,612
9 Claims. (Cl. 287—20.92)

This invention relates to improvements in fastening devices and more particularly to a unique longitudinally movable strip fastener for quickly and easily, securely connecting and uniting adjacent slotted members. This application is a continuation-in-part of my prior application Serial No. 157,517 filed December 6, 1961, now abandoned.

In the construction of buildings, furniture and the like, adjacent members are conventionally secured by well known means such as nails, dowels and splines. The use of nails necessitates individual driving of a plurality of nails and is a time consuming purocess and usually leaves the nail heads exposed. The seucring of adjacent members by dowels and splines conceals the connecting means but is even more time consuming and consequently is commonly used only for joining relatively expensive products wherein the appearance is highly desirable but the cost may be relatively high.

It is an object of this invention to provide a unique fastening device for abutting slotted members; the fastening device fitting in the slotted members in the nature of a spline, but positively securing the slotted members and cinching them together upon longitudinal movement of the fastening device.

It is a further object of this invention to provide a fastening device which is inexpensively formed from a single elongated strip of tough resilient material such as steel strapping, with the attendant advantages of handling and shipping as a roll of strip material and being able to use conventional steel strapping tools for pulling the fastener longitudinally for its cinching and securing movement.

Another object of this invention is to provide a fastener adapted to fasten and cinch a pair of adjacent panels by diagonally inclined teeth within slots in the panel and especially to provide means on the teeth to allow the teeth to dig into the slots in the panel upon longitudinal movement of the fastener strip.

It is an additional object of this invention to provide an elongated resilient fastener of this nature with means for securing the fastener and preventing back movement so that the parts will not become loose or unsecured.

It is a further object of this invention to provide a fastener of the nature described above which may be manufactured in mass production at low cost from a single strip of steel material, may be easily and quickly handled to assemble, cinched together and securely hold adjacent slotted members.

A better understanding of the invention together with further objects and advantages thereof will be further understood from a consideration of the following description taken in connection with the accompanying drawings.

In the drawings:

FIG. 1 is an exploded perspective view of the fastener of this invention together with a pair of edge slotted members adapted to be fastened thereby;

FIG. 2 is a perspective view of the fastener of this invention with the pair of edge slotted members fastened thereby and the fastener secured at one end to prevent back movement;

FIG. 3 is a partial sectional view showing the fastener of this invention with the edge slotted members secured thereby;

FIG. 4 is a sectipnal view taken along line 4—4 of FIG. 3;

FIG. 5 is a detail enlarged sectional view taken along 5—5 of FIG. 1 and showing a configuration allowing the barbs or knife edge teeth of the fastener to dig into the sides of the slots of the members;

FIG. 6 is a front elevation view of a modified form of the fastener with a back out prevention tooth and cinching and fastening teeth alternately protruding from both faces of the strip;

FIG. 7 is a side elevation view of the fastener of FIG. 6;

Figure 8:
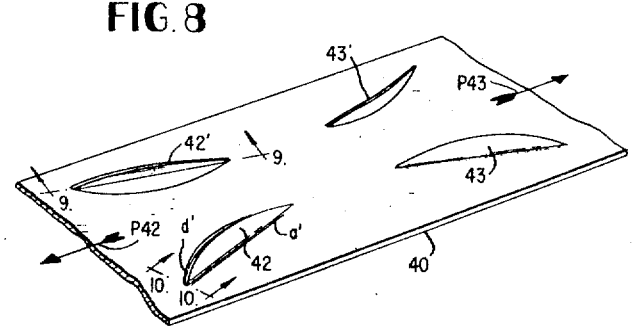
FIG. 8 is a perspective view of another modification of the fastener of this invention capable of cinching adjacent members together and preventing back movement in either direction.

In general, this invention contemplates an elongated fastening strip of tough resilient material such as steel strapping which may be handled and shipped as a roll and mass produced, having formed integrally therefrom along both edges rows of slot engaging knife edge teeth which are diagonally inclined to cinch together a pair of adjacent edge slotted members. After the fastener is positioned within the slots of the adjacent slotted members, the fastener and members are moved longitudinally relative to one another to cinch the slotted members together as the diagonally inclined knife edges of the teeth of the fastener dig into the slots. Means are also provided for prevening back out movement of the fastener. The invention further contemplates that the diagonally inclined knife edge teeth are sharper at the point of insertion than they are at the trailing edge so that they will initially start digging into the slot. In one embodiment the means for preventing back out may consist of securing the end of the strip. In another embodiment the means for preventing back out may be a back out prevention tooth extending transversely across the strip. In a further embodiment relative movement of the fastener strip and edge slotted members in either direction will cinch the members together and prevent reverse or back movement. Also, the rows of teeth along the edges of the fastening strip may extend from both faces of the strip for better fastening. In an additional embodiment, the strip instead of being flat may be T-shaped although still formed from a single piece of material and may have extending teeth on each portion of the T for the purpose of securing together three members in abutting relationship.

Referring now specifically to the drawings, in FIG. 1 there is shown the fastening strip 10 which is the subject of the invention. The fastening strip 10 is preferably formed from an elongated strip of tough resilient hard material such as heat treated steel strapping; for example, .040 inch thick, 2 inches wide and of indeterminate length, allowing it to be cut to the desired length of the member being fastened.

Fastening strip 10 is adapted to secure together a member or panel 12 having an edge slot 14 to another member or panel 16 having an edge slot 18 so that the edges of the panels having the slots are in abutting relationshij. The panels 12 and 16 may, for example, be wood and the slots 14 and 18 may be formed as saw kerfs quickly and expediently by power saws.

The fastener 10 includes a pair of sides 20 and 22 which run the length of the fastener strip 10 and along the edge of each side there is a row of teeth such as teeth 26, 26 and teeth 24, 24. These teeth are formed integrally from the strip, for example, by punching the strip as it is manufactured. On forming the teeth from the plane of the strip 10 the teeth are bent along a diagonally inclined bend line $a$ so that a short edge $b$ and a long diagonal knife edge $c$ extend from the center of the strip toward the outside. Bend line $a$ and knife edge $c$ meet at a tooth point $d$. The edge $c$ extends diagonally of the longitudinal axis of the strip 10 and also extends at an acute angle to the plane of the strip 10 as shown in FIGS. 3 and 7, for example.

As can be seen in FIG. 1 the open side of the teeth extend in the direction of the center of the strip and away from the edges of the strip so that the teeth may be readily inserted in the slots 14 and 18.

As shown in FIGS. 1, 3 and 5, for example, the point of each tooth $d$ is formed at a greater angle than the tip of the edge $c$ where this edge joins edge $b$. For example in FIG. 5 the point of the strip $d$ is bent upright from the plane of the strip 10 at practically a 90° angle whereas the other end of the edge $c$ is at a much less angle, for example, 30°. This allows the knife edges $c$ to bite into the face of the slots 14 and 18 as the strip is pulled longitudinally; resulting in a more efficient engagement than if a tooth was in a single plane instead of being curved in the nature of the bow of a ship. A cutting burr $g$ on the leading edge of the teeth acts as a cutting chisel to provide positive cutting action and this construction is less likely to split the members if they are made of wood.

When the panels 12 and 16 are being assembled partially over the fastener strip 10 they will slide relatively easily over the teeth 24 and 26 even though the point $d$ is bent at a sharp angle. After the partial insertion of the boards over the strips so that slot 14 covers the row of teeth 24, 24 and the slot 18 covers the teeth 26, 26, the strip 10 and the members 12, 16 are moved longitudinally relative to one another in the direction of the point $d$ as shown by the arrow P on FIG. 3. This relative longitudinal movement may be accomplished by pulling the strip 10, for example, by conventional steel strapping tools which are available commercially. Relative longitudinal movement of the strip 10 causes the point $d$ and the edges $c$ to dig into the corresponding slots of members 12 and 16 and as the pulling continues the diagonal slant of the knife edges $c$ and the bend line $a$ causes the members 12 and 16 to be cinched together. Another method for providing the relative movement would be to assemble the panels on the edges of the strip with one panel longitudinally offset from its final desired position, e.g., the top of panel 12 and strip 10. Then the panels would be knocked together until their ends are flush thus causing the relative movement. Upon relative longitudinal movement of the strip 10, the canted or diagonal bend line $a$ reinforces the camming or cinching action of the knife edges $c$. Without the canted bend line the teeth themselves would bear the load of the camming or cinching action and would not adequately transmit it to the strip 10. Thus, it can be seen that two relatively large members 12 and 16 can be secured together by a single elongated strip by merely pulling the strip 10 longitudinally until it can be pulled no further.

To prevent back out movement after the panels have been cinched together by the longitudinal pulling of the strip 10, the strip may be secured by bending over the end and nailing it to the face of the panels, for example, as shown in FIG. 2 wherein the end 30 of the strip 10 is bent over the bottom edges of panels 12 and 16 as shown and is secured by conventional nails 32 or the like. This is one of the ways to secure a strip fastener if the strip is used in rough construction.

Another means for preventing back out movement of the strip fastener is illustrated in the embodiment shown in FIGS. 6 and 7. In this embodiment the strip includes at least one transverse resilient tooth 34 between adjacent pairs of diagonal teeth 24 and 26. An extending edge $e$ of tooth 34 faces in a direction opposite to the direction of movement of the strip in its cinching and securing action so that the strip is readily allowed movement in the direction of the arrow in FIG. 6 but any back movement is prevented by the edge $e$ of the tooth 34 digging into the corresponding slots.

It is also contemplated that the rows of teeth 24 and 26 may alternate in pairs in extending from one face of the strip and then the other as illustrated in FIGS. 6 and 7, wherein teeth 26' and 24' extend from one face of the strip and teeth 26 and 24 extend from the other face of the strip. This construction tends to balance the forces and redistribute the stress. Other alternation and staggering of the teeth in other forms are possible for the same purpose and also to tend to prevent the saw kerf from opening.

Figure 10:
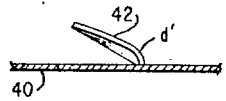
FIG. 10 is a sectional view taken along line 10—10 of FIG. 8.
Figure 9:
FIG. 9 is a sectional view taken along line 9—9 of FIG. 8.

The embodiment shown in FIGS. 8–10 is similar in general respects to the previous embodiment. A resilient strip 40 has integrally formed therefrom pairs of teeth 42, 42' and 43, 43' which are generally diagonally inclined opposite to one another so as to cinch the adjacent members together upon relative longitudinal movement thereof and prevent back out movement, irrespective of the direction of cinching movement. Each of the diagonally extending teeth is formed as a chord of a circle from a canted bend line $a'$. One edge $d'$ of each tooth in the direction of its cinching movement may be inclined sharply to bite into the slots as explained above. The device will cinch together the panels and prevent back out movement independent of the direction of relative cinching movement due to the fact that one pair of teeth will accomplish cinching and the other pair will prevent back out in one direction of movement and vice versa. For example, relative movement in the direction of arrow $P_{42}$ will cause teeth 42, 42' to cinch the panels together while teeth 43, 43' will prevent back out. In the case of movement in the direction of arrow $P_{43}$ the same teeth will assume the opposite function. The teeth may also be alternated from opposite faces of the strip 40 in the manner of FIG. 7 to prevent the slots from tending to open.

Figure 11:
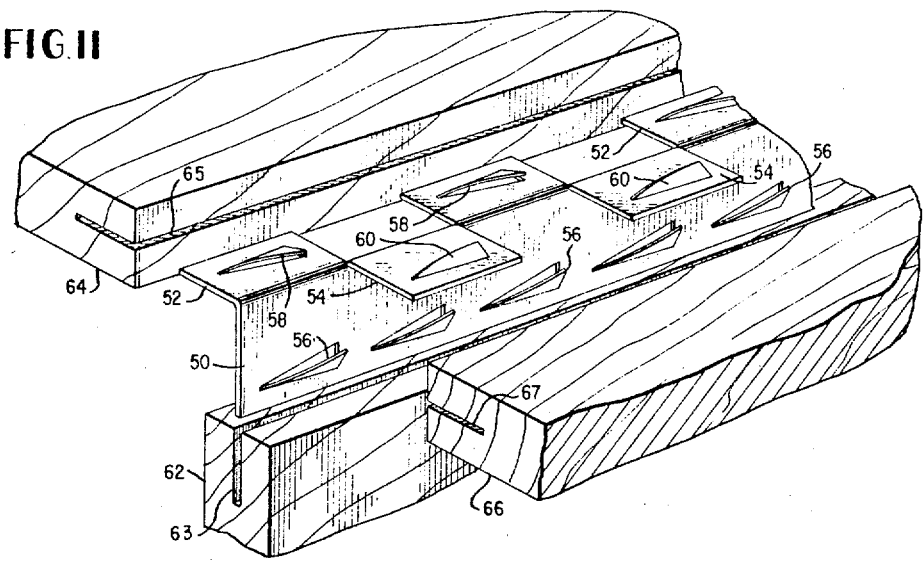
FIG. 11 is an exploded perspective view of a modification showing the invention adapted for securing three panels together in a generally T-shaped configuration.
Figure 12:
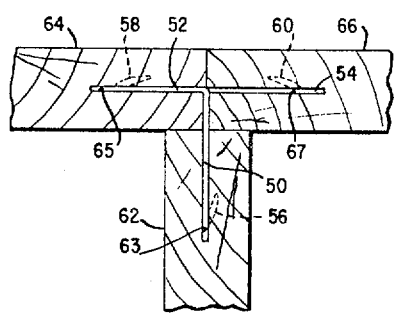
FIG. 12 is an end view of the three panels secured together in a T-shaped configuration utilizing the fastener shown in FIG. 11.

Another modification of the fastening device is shown in FIGS. 11–12. In this embodiment the fastening device is modified to join three panels in abutting relationship. Again a strip 50 is formed from an elongated strip of tough resilient material such as steel strapping. One edge of the strip has been cut at spaced intervals and bent alternately in opposite directions to form a series of tongues 52 and 54 extending at right angles to the original plane of the strip 50. The tongues 52 and 54 alternate on both sides of the plane of the strip 50 throughout the length thereof. Along the outside edge of the strip are an elongated set of teeth 56 of the same construction as described above while similar teeth 58 and 60 are on the tongues 52 and 54 respectively. Three panels 62, 64 and 66 each contain slots 63, 65 and 67. The body of the strip 50 with teeth 56 may be inserted in slot 63 while tongues 52 with teeth 58 are inserted in slot 65 and tongues 54 with teeth 60 are inserted in slot 67. The strip is then pulled in the direction of the arrow shown in FIG. 11 to cinch the three panels 62, 64 and 66 together and produce the finished T joint shown in FIG. 12. Again suitable back movement prevention means may be provided as described in the previous embodiments.

While there has been shown and described and pointed out the fundamental novel features of the invention as applied to preferred embodiments, it will be understood that various omissions and substitutions and changes in the form and detail of the device illustrated and in its operation may be made by those skilled in the art without departing from the spirit of the invention. It is the ininvention, therefore, to be limited only as indicated by the scope of the following claims.

What is claimed is:

1. A fastener device for securing and cinching together adjacent edge slotted members, the fastening device comprising;
(a) an elongate strip of tough resilient material,
(b) a pair of rows of resilient teeth integrally formed from the strip and protruding from the plane thereof,
(c) each of the rows of teeth positioned along each longitudinal edge of the strip to be insertable into the slot of the members to be adjoined, and
(d) each of the resilient teeth having a protruding edge extending generally diagonally to the longitudinal axis of the strip and extending at an acute angle to the plane of the strip with a high point on the protruding edge closer to the center of the strip than a low point to provide a cinching action bringing together adjacent edge slotted members upon relative longitudinal movement of the members and the fastening device.

2. A fastener device as defined in claim 1 further comprising means on the strip for preventing back-out movement of the strip after the panels are cinched together.

3. A fastener device as defined in claim 2 wherein the rows of teeth are all on the same side of the strip.

4. A fastener device as defined in claim 2 wherein the pairs of teeth in each row alternate in projecting from one side of the strip and then from the other side of the strip.

5. A fastener device as defined in claim 2 wherein the teeth are triangular in shape and are bent from a bend line which extends diagonally to the longitudinal axis of the strip.

6. A fastener device as defined in claim 2 wherein the teeth are portion of a circle with the bend line as a chord of the circle and diagonally inclined to the longitudinal center line of the strip.

7. A fastener device as defined in claim 2 wherein the means for preventing back-out movement includes at least one back-out prevention tooth positioned transversely across the width of the elongated fastener.

8. A fastener device as defined in claim 2 wherein the means for preventing back-out movement includes at least some teeth having diagonally inclined slot engaging edges extending in the opposite direction to accomplish cinching and prevent back-out movement when the relative movement is in either direction.

9. A device for fastening edge slotted members in abutting relationship and cinching the members together comprising;
(a) an elongated strip of tough resilient steel strapping material, capable of being handled in bulk in roll form,
(b) a pair of rows of resilient teeth struck from the strip and protruding from the plane of the strip,
(c) each of the rows of the teeth positioned along the longitudinal edge of the strip to be insertable into the edge slots of the members to be fastened,
(d) each of the teeth in each row having a slot engaging protruding edge extending generally diagonally to a longitudinal axis of the strip and extending at an acute angle to the plane of the strip with a high point of the edge closer to the center of the strip than a low point such that relative longitudinal movement of the strip in the direction of the low point from the high point cinches the panels together,
(e) a cutting burr formed on the leading edge of the teeth at the low point,
(f) and tooth means integral with the strip for preventing movement of the strip after the panels are cinched together.

References Cited by the Examiner

UNITED STATES PATENTS

| | | | |
|---|---|---|---|
| 754,215 | 3/1904 | Hayward | 20—92 X |
| 792,094 | 6/1905 | Ware | 20—92 X |
| 1,274,953 | 8/1918 | Stoehr | 20—8 X |
| 1,492,596 | 5/1924 | Fenno | 20—92 |
| 1,663,580 | 3/1928 | Andersin | 20—92 |
| 1,822,217 | 9/1931 | Hudson et al. | 20—92 X |
| 2,562,779 | 7/1951 | Een | 20—92 |
| 3,065,508 | 11/1962 | Pilliod | 20—92 |

FOREIGN PATENTS 25,225  11/1919  Denmark.

FRANK L. ABBOTT, *Primary Examiner.*

JACOB L. NACKENOFF, EARL J. WITMER,
*Examiners.*

T. W. FLYNN, R. A. STENZEL, *Assistant Examiners.*